US 6,646,755 B1

(12) United States Patent
Iwai et al.

(10) Patent No.: US 6,646,755 B1
(45) Date of Patent: *Nov. 11, 2003

(54) IMAGE PROCESSING APPARATUS ALLOWING AUTOMATIC PRINTING AS NEEDED

(75) Inventors: Toshimichi Iwai, Okazaki (JP); Hideo Muramatsu, Shinshiro (JP); Akinori Yoshida, Nishio (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,767

(22) Filed: Mar. 24, 1997

(30) Foreign Application Priority Data

Mar. 25, 1996 (JP) ............................. 8-068492

(51) Int. Cl.⁷ ..................... G06F 15/00; H04N 1/32
(52) U.S. Cl. ................ 358/1.14; 358/1.15; 358/442
(58) Field of Search .................. 358/442, 444, 358/468, 400, 404, 405, 434, 407; 395/101, 103, 106, 109, 113, 114, 115; 379/100.01

(56) References Cited

U.S. PATENT DOCUMENTS

| | | | | | |
|---|---|---|---|---|---|
| 4,821,107 A | * | 4/1989 | Naito et al. | ................. | 358/300 |
| 4,924,494 A | * | 5/1990 | Shung | ......................... | 379/100 |
| 4,930,017 A | * | 5/1990 | Izawa | ......................... | 358/296 |
| 5,019,916 A | * | 5/1991 | Ogura | ......................... | 358/449 |
| 5,235,674 A | * | 8/1993 | Cohen-Skalli et al. | ...... | 358/468 |
| 5,357,350 A | * | 10/1994 | Matsunai | .................... | 358/468 |
| 5,410,419 A | * | 4/1995 | Muramatsu et al. | ........ | 358/468 |
| 5,418,629 A | * | 5/1995 | Miura | ........................ | 358/471 |
| 5,450,530 A | * | 9/1995 | Snyder et al. | ............. | 375/220 |
| 5,565,964 A | * | 10/1996 | Tashiro et al. | ............. | 355/210 |
| 5,694,528 A | * | 12/1997 | Hube | ......................... | 395/113 |
| 5,740,336 A | * | 4/1998 | Wakisaka et al. | .......... | 395/113 |
| 5,748,337 A | * | 5/1998 | Minamizawa | .............. | 358/468 |
| 5,790,279 A | * | 8/1998 | Sakellapoulos | ............ | 358/498 |
| 5,796,496 A | * | 8/1998 | Ono | ........................... | 358/498 |
| 5,802,261 A | * | 9/1998 | Yokoyama | .................. | 395/115 |
| 5,877,869 A | * | 3/1999 | Tachibana | .................. | 358/437 |
| 5,910,848 A | * | 6/1999 | Ono | ........................... | 358/404 |
| 5,933,246 A | * | 8/1999 | Ono | ........................... | 358/404 |

* cited by examiner

Primary Examiner—Mark Wallerson
(74) Attorney, Agent, or Firm—McDermott, Will & Emery

(57) ABSTRACT

A digital copying machine having a facsimile function includes an automatic printing unit and a determining unit which determines a key input made by an operator. Only when it is determined by the determining unit that the key input is made for an operation related to copy or print, an automatic printing inhibition flag is set, thereby inhibiting automatic printing. Accordingly, a digital copying machine having a facsimile function can be provided in which automatic printing is not inhibited unnecessarily.

23 Claims, 11 Drawing Sheets

IMAGE PROCESSING APPARATUS ALLOWING AUTOMATIC PRINTING AS NEEDED

BACKGROUND OF THE INVENTION

1. Field of the Invention

The present invention relates to an image processing apparatus which has a facsimile function.

2. Description of the Background Art

An automatic printing function is incorporated in a digital copying machine having the facsimile function. The automatic printing function allows the digital copying machine to automatically print out an original received by a memory through the facsimile function as well as a facsimile communication management report. However, such a copying machine is provided with only one printer, so that the automatic printing function may impedes operations by an operator such as the one related to copying and the one related to printing of a report created independently in the copying machine by manual operation.

A digital copying machine has been proposed which has a function of inhibiting the automatic printing for a prescribed period after the operator operated an operation panel, in order to prevent impediment by the automatic printing function to the operation by the operator.

In the conventional digital copying machine having the function of inhibiting automatic printing, automatic printing is excessively inhibited by the operation by the operator. Actually, the operation by the operator is impeded by the automatic printing operation only when, for example, the operator performs an operation related to copying or an operation related to printing of a report or the like by manual operation in facsimile mode (manual printing).

However, in the conventional digital copying machine described above, the automatic printing is similarly inhibited even if the operator carries out other operations related to, for example, reading of an original document to be transmitted. Accordingly, the operator is kept waiting until the automatic printing starts. In other words, even if the operator performs a manual operation which is not impeded by the start of the automatic printing, the automatic printing is inhibited unnecessarily.

SUMMARY OF THE INVENTION

One object of the present invention is, in an image processing apparatus, not to inhibit automatic printing unnecessarily.

Another object of the present invention is, in an image processing apparatus, to inhibit automatic printing only when a function related to printing operation is set.

A further object of the present invention is to provide a method of image processing which does not inhibit automatic printing unnecessarily.

Above objects of the present invention are achieved by an image processing apparatus including following components. An image processing apparatus according to the present invention includes:

a first setting unit for setting a function related to printing operation;

a second setting unit for setting a function related to facsimile transmission;

a printer for performing printing based on image data;

a transmission unit for transmitting the image data to an external apparatus;

an automatic printing unit for allowing the printer to automatically perform printing operation irrespective of the setting by the first setting unit;

a determining unit for determining whether the setting is made by the first setting unit or by the second setting unit; and an automatic printing controller for inhibiting performance of automatic printing operation if it is determined that the setting is made by the first setting unit, and for permitting automatic printing operation if it is determined that the setting is made by the second setting unit.

The setting of a function is determined, and automatic printing is inhibited if a function related to printing operation is set. On the other hand, automatic printing is permitted if a function related to facsimile transmission operation is set. As a result, automatic printing is not inhibited unnecessarily in an image processing apparatus.

According to another aspect of the present invention, an image processing apparatus includes:

an input unit for setting an operation of the image processing apparatus;

a transmission unit for transmitting image data to an external apparatus;

a printer for performing printing based on the image data;

an automatic printing unit for allowing the printer to perform printing operation automatically irrespective of the setting by the input unit;

a determining unit for determining whether an operation related to printing or an operation related to facsimile transmission is set by the input unit; and an automatic printing controller for inhibiting performance of automatic printing operation if it is determined that an operation related to printing is set, and for permitting automatic printing operation if it is determined that an operation related to facsimile transmission is set.

The input setting of the operation is determined, and automatic printing is inhibited if it is determined that an operation related to printing is set, and automatic printing is permitted if it is determined that an operation related to facsimile transmission is set. As a result, an image processing apparatus is provided in which automatic printing is inhibited only when an operation related to printing is set.

According to further aspect of the present invention, a method of image processing includes the steps of:

setting a function related to printing operation;

setting a function related to facsimile transmission;

performing printing operation based on image data;

transmitting the image data to an external apparatus;

allowing automatic printing operation irrespective of the setting of the function related to printing operation;

determining whether a function related to printing operation is set or related to facsimile transmission is set; and inhibiting automatic printing operation if it is determined that a function related to a printing operation is set, and permitting automatic printing if it is determined that a function related to facsimile transmission is set.

Determination is made as to whether a function related to printing operation is set or a function related to facsimile transmission is set. If it is determined that a function related to printing operation is set, automatic printing operation is inhibited. On the other hand, if it is determined that a function related to facsimile transmission is set, automatic printing is permitted. As a result, a method for processing an image is provided in which automatic printing is not inhibited unnecessarily.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description of a digital copying machine having a facsimile function according to one embodiment of the present invention will be given in the following order.

Figure 1:
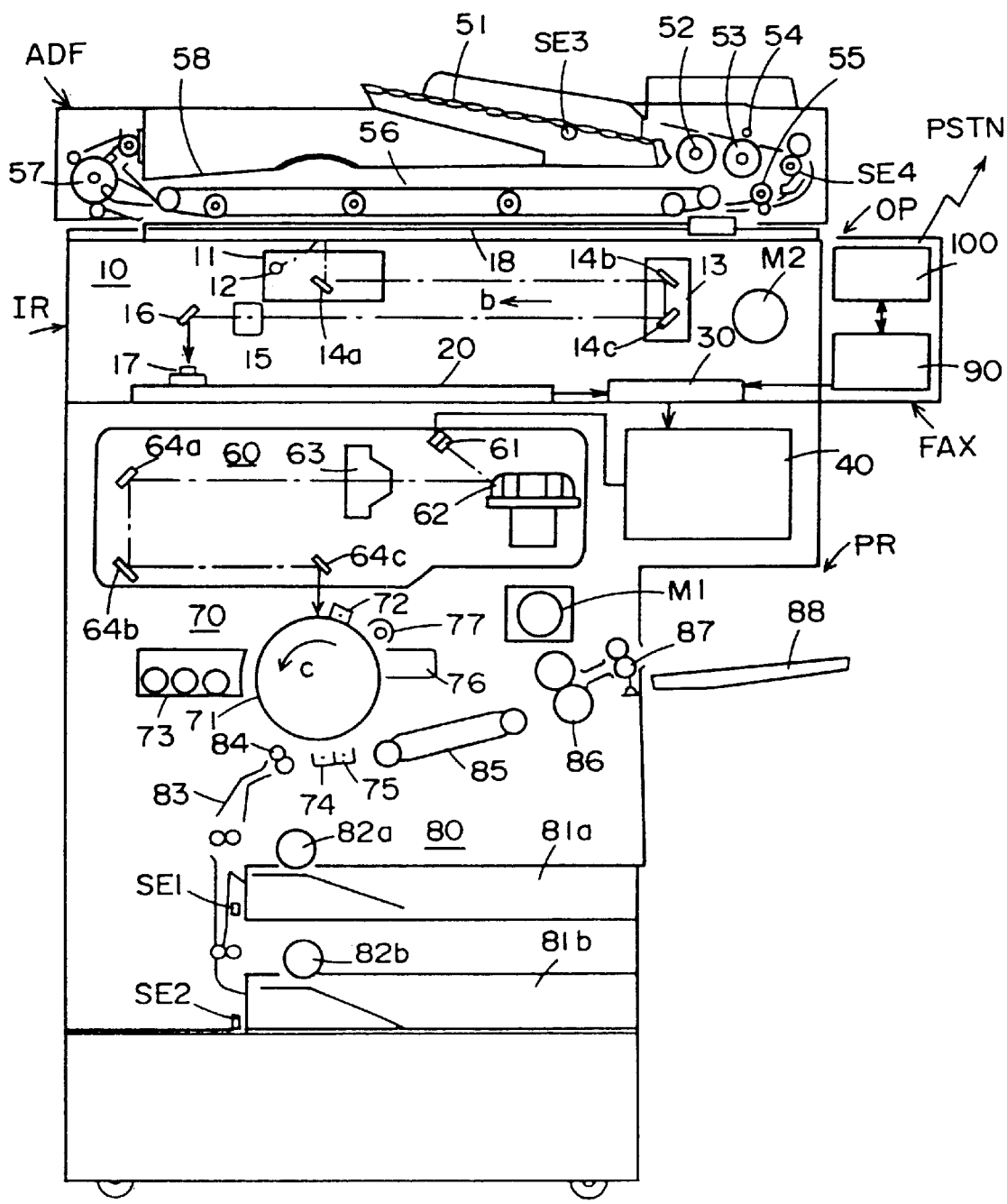
FIG. 1 is a cross sectional view illustrating a schematic structure of a digital copying machine according to one embodiment of the present invention.

(1) Outline of the Entire Structure and the Structure and Operation of Each Unit (2) Outline of the Structure and Operation of the Control Unit (3) Operation Sequence of the Copying Machine as a Whole in Each Operation Mode (4) Outline of the Control Flow of Each CPU (1) Outline of the Entire Structure and the Structure and Operation of Each Unit With reference to FIG. 1, a digital copying machine 1 is generally constituted by an automatic document feeder ADF, an image reader IR, a printer PR, a facsimile transmission and reception unit FAX, and an operation input unit OP (placed in a direction perpendicular to the paper). These are controlled by a control unit 200 which controls each unit or all units as a whole.

General description of a copy operation will be given. An operator inputs the content of operation to operation input unit OP. Automatic document feeder ADF sets an original to be copied at image reader IR one by one. Image reader IR reads the image on the set original and generates image data. Printer PR receives the image data from image reader IR and prints the image onto a sheet.

Next a general description of a facsimile transmission operation will be given. An operator inputs the content of operation to operation input unit OP. Automatic document feeder ADF sets an original to be facsimile transmitted at image reader IR one by one. Image reader IR reads the image on the set original and outputs image data. Transmission and reception unit FAX receives the image data from image reader IR and transmits the image data to a telephone line (PSTN).

An operation of facsimile reception will be generally described. Transmission and reception unit FAX receives the image data from the telephone line (PSTN). Image reader IR temporarily stores the image data. Printer PR receives the image data from image reader IR and prints the image onto a sheet.

Automatic document feeder ADF provided at the upper portion of digital copying machine 1 includes a document placement tray 51, a pickup roller 52, a sort roller 53, a sort pad 54, a register roller 55, a transport belt 56, a reversing roller 57, a discharge tray 58, and sensors SE3, SE4.

A plurality of originals can be stacked on document placement tray 51 with their sides having images to be copied facing upward. The originals placed are fed one by one starting from the lowermost one by pickup roller 52, sorted by sort roller 53 and sort pad 54, and reversed along a transport path. The reversed originals are transported onto a platen glass 18 of image reader IR via register roller 55 and set on platen glass 18, and the images on the originals are read by image reader IR. After the reading is completed, the original is transported by transport belt 56, and discharged onto discharge tray 58 via reversing roller 57.

If the original is a double sided document, the document is rotated once around reversing roller 57 and returned to platen glass 18. Therefore, transport belt 56 is rotatable in forward/reverse directions.

Sensor SE3 detects if the original is set on document placement tray 51. Sensor SE4 is located on the way of the transport path along which the document is conveyed to platen glass 18 of image reader IR. Sensor SE4 detects the size and direction of the document according to the time when the transported document is detected.

Here, an original set with its longer side being parallel to the direction of transport will be referred to as a portrait original, while one with its longer side being vertical to the direction of transport will be referred to as a landscape original.

Document feeder ADF can be opened to platen glass 18. An operator can directly set the document on platen glass 18.

The size and direction of the document placed on platen glass 18 of image reader IR can be determined even if the document is directly set on platen glass 18. The outer surface of transport belt 56 (the surface facing platen glass 18 of image reader IR) is colored in orange. For a line sensor 17 of image reader IR, the color is of lesser spectral sensitivity compared with the light reflected from the surface of the document. Therefore, the region of the platen glass 18 of image reader IR where the document is placed can be identified using the difference of the spectral sensitivity. Accordingly, the size and direction of the document can be detected.

Image reader IR is constituted by: a scan optical system 10 for scanning the original image and generating image data; an image data processing unit 20 for processing the image data sent from scan optical system 10; and a memory unit 30 for determining whether the image data transmitted from image data processing unit 20 should be output to printer unit PR as print data or should be stored in the memory, and storing the print data.

Scan optical system 10 is constituted by a first scanner 11, an exposure lamp 12, a second scanner 13, a first mirror 14a, second mirrors 14b, 14c, an image formation lens 15, a mirror 16, line sensor 17, platen glass 18 and a motor M2.

Exposure lamp 12 and first mirror 14a are held by first scanner 11, and second mirrors 14b, 14c are held by second scanner 13. Line sensor 17 is formed of a CCD having a plurality of image pick-up devices arrayed in a line. First scanner 11 and second scanner 14 are respectively driven by motor M2, and moved in the direction of an arrow b (sub scan direction) orthogonal to the direction of arrangement of the CCD of line sensor 17 directly below platen glass 18 (main scan direction). This movement allows the original image set on platen glass 18 to be scanned and read out.

Since image data processing unit 20 and memory unit 30 are closely related to control unit 200, they are described in the section of "(2) Outline of the Structure and Operation of the Control Unit".

Printer unit PR is constituted by a print processing unit 40 for driving an optical system 60 based on the print data sent from memory unit 30 of image reader IR, optical system 60 for directing laser beam having the print data in accordance with print processing unit 40, an image forming system 70 for performing the process of converting the laser beam directed by optical system 60 to an image on a sheet, and a sheet transport system 80 for transporting the sheet to or from image forming system 70.

Print processing unit 40 receives the print data from memory unit 30 of image reader IR. Based on the print data, print processing unit 40 controls the laser beam emitted from optical system 60.

Optical system 60 is constituted by a semiconductor laser 61, a polygon mirror 62, an Fθ lens 63, and mirrors 64a, 64b, 64c.

Semiconductor laser 61 has its modulation (on, off) controlled by print processing unit 40. Polygon mirror 62 deflects the laser beam emitted from semiconductor laser 61 and scans the original. Fθ lens 63 makes correction of distortion aberration of the deflected laser beam or the like. Mirrors 64a, 64b, 64c direct thus obtained laser beam to image forming system 70.

Image forming system 70 is constituted by a photoreceptor drum 71, a corona charger 72, a developer 73, a transfer charger 74, a sheet separation charger 75, a cleaner 76, and an eraser lamp 77.

The laser beam modulated according to print data and emitted from optical system 60 scans the surface of the photoreceptor drum 71 which is uniformly charged by corona charger 72 line by line, and produces an electrostatic latent image on the surface of photoreceptor drum 71 corresponding to the image to be developed. The electrostatic latent image thus produced is developed by developer 73 and transferred onto the sheet transported by sheet transport system 80 described below. The surface of photoreceptor drum 71 is cleaned by cleaner 76 after the transfer, and the residual charges are erased by eraser lamp 77 in order to prepare for the next original image.

Sheet transport system 80 is formed of feed cassettes 81a, 81b, feed rollers 82a, 82b, a sheet transport path 83, a timing roller 84, a transport belt 85, a fixing unit 86, a discharge roller 87, a discharge tray 88, sensors SE1, SE2, and a motor M1.

The sheets within feed cassettes 81a, 81b are fed by feed rollers 82a, 82b one by one in order, and transported along sheet transport path 83 to timing roller 84. Timing roller 84 sends out the sheet to a transfer portion located between photoreceptor drum 71 and transfer charger 74 of image forming system 70 such that the sheet is synchronized with the image formed on photoreceptor drum 71 of image forming system 70. The sheet having an image transferred thereon is sent to fixing unit 86 by transport belt 85. After the image is fixed on the sheet at fixing unit 86, the sheet is discharged by discharge roller 87 onto discharge tray 88. Main motor M1 drives sheet transport system 80 and the photoreceptor drum 71 of image formation system 70.

Feed cassettes 81a, 81b can accommodate the sheets of B5 and A4 sizes respectively in both of landscape and portrait directions, and can accommodate the sheets of B4 and A3 sizes in portrait direction. Any of the sheets of any size is stacked in either direction and accommodated in feed cassettes 81a, 81b. The size and the direction of the accommodated sheets are detected by sensors SE1, SE2.

Here, a sheet set with its longer side being parallel to the direction of transport will by referred to as a portrait original, while one with its longer side being vertical to the direction of transport will be referred to as a landscape original.

Facsimile transmission and reception unit FAX is constituted by a facsimile conversion unit 90 and a G3 unit 100. Since these units have closer relation to the control unit, they are described in the section of "(2) Outline of the Structure and Operation of the Control Unit".

Figure 2:
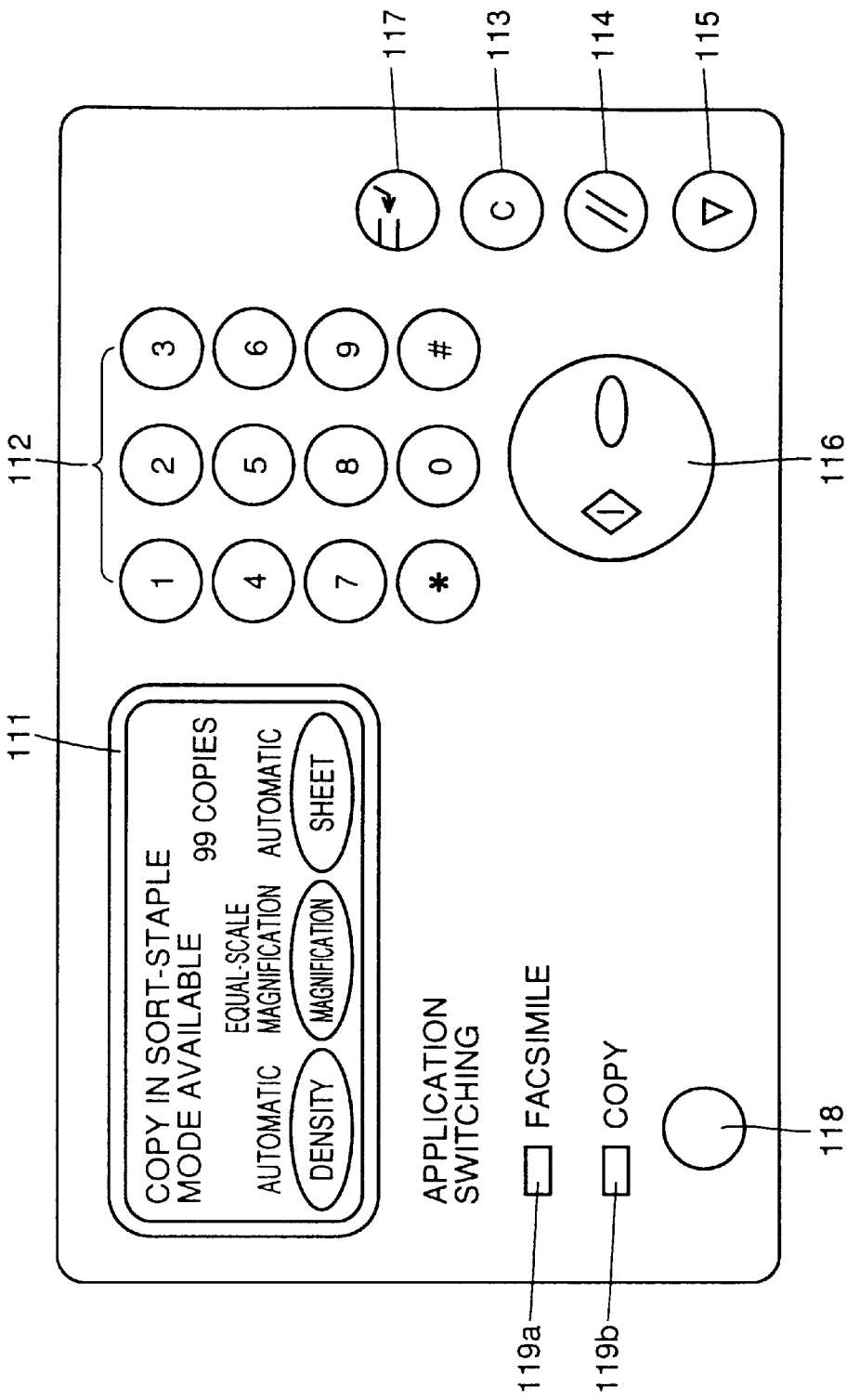
FIG. 2 is a plan view showing a structure of operation input apparatus OP of a digital copying machine.

FIG. 2 is a plan view of operation input unit OP provided at the upper surface of digital copying machine 1. Operation input unit OP includes a liquid crystal touch panel 111, a ten key 112, a clear key 113, a reset key 114, a stop key 115, a start key 116, an interruption key 117, an application switching key 118, and display units 119a, 119b.

Liquid crystal touch panel 111 provides display of the operation state of a copying machine such as density, copy magnification scale, recording sheet size, various abnormal states of the copying machine such as occurrence of jam, serviceman call, paper empty, and the like, the facsimile number of the receiver, transmission resolution, the facsimile mode such as polling, the operation state of facsimile during communication, and other information.

Furthermore, liquid crystal touch panel 111 allows input of an automatic select mode of a copy operation such as the density, copy magnification, and recording sheet size and the transmission resolution.

Ten key 112 is used for inputting the number of copies or magnification scale, or the facsimile number of the receiver, clear key 113 is used for restoring the values of the ten key and the like to the default value of "1", and reset key 114 is used for restoring the values set in the digital copying machine to respective default values.

Stop key 115 is used for inhibiting a copy operation and a facsimile operation, start key 116 is used for initiating a copy operation and a facsimile operation, and interruption key 117 is used for carrying out a copy or manual printing interruptively during automatic printing.

Operation input unit OP is further provided with application switching key 118 for switching between a facsimile mode and a copy mode, as well as display unit 119a for indicating that facsimile mode is selected, and display unit 119b for indicating that copy mode is selected.

(2) Outline of the Structure and Operation of the Control Unit

Figure 3:
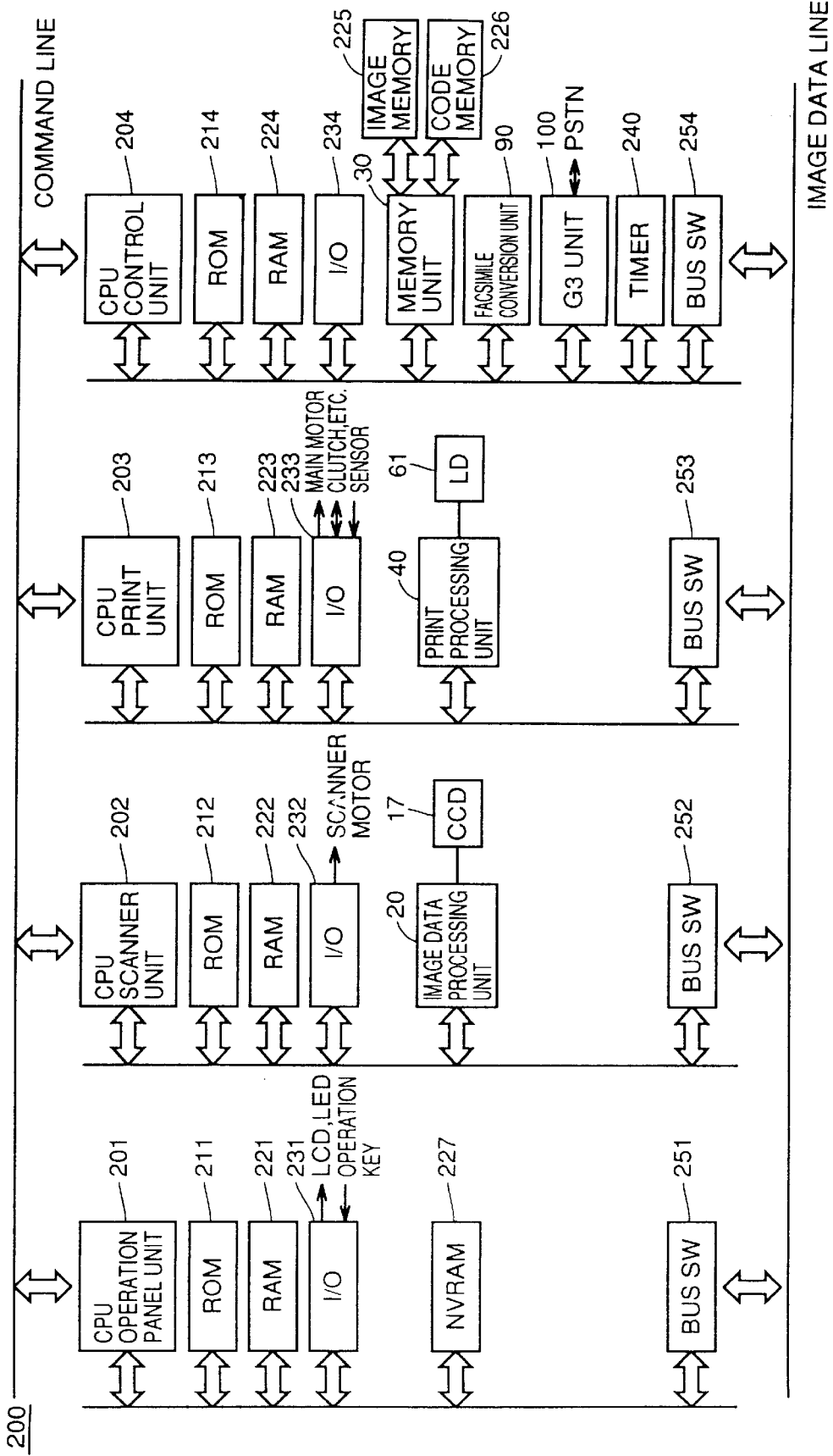
FIG. 3 is a block diagram of a control unit.

FIG. 3 is a block diagram showing a structure of control unit 200. Control unit 200 includes four CPUs 201–204 as main components. CPUs 201–204 respectively include ROMs 211–214 for storing programs, RAMs 221–224 forming the working area, and the like connected thereto.

CPUs 201–204 are connected with each other via a command line such that exchange of required command information is carried out. Input and output of image data is carried out through an image data line. In this case, each CPU is connected to the image data line via each of BUS SWs (bus switches) 251–254.

Each CPU further includes following units connected thereto.

The LCD, LED and operation key of operation input unit OP are connected to CPU 201 via an I/O interface 231. An NVRAM (non-volatile memory RAM) 227 is further connected to CPU 201. Motor M2 of image reader IR is connected to CPU 202 via an I/O interface 232. In addition, image data processing unit 20 for inputting image data from the CCD on line sensor 17 is connected to CPU 202. To CPU 203, motor M1, a clutch, and sensors SEI, SE2 of printer unit PR are connected via an I/O interface 233. Print processing unit 40 for outputting image data to semiconductor laser 61 is further connected to CPU 203. An I/O interface 234 is connected to CPU 204. Further, an image memory 225 and a code memory 226 in memory unit 30, facsimile conversion unit 90, a TIMER 240, and a G3 unit 100 connected to the telephone line (PSTN) are connected to CPU 204.

An operation of each CPU will be hereinafter described.

CPU 201 carries out control of the input from various operation keys of operation input unit OP as well as output of display to the display unit. Initial mode setting, total counter, individual item counters, and password number are stored in NVRAM 227.

CPU 202 controls each unit of image data processing unit 20 of image reader IR and controls drive of scan system 10 via I/O interface 232.

CPU 203 carries out control of print processing unit 40, optical system 60, and image formation system 70 of a printer unit PR via I/O interface 233.

CPU 204 carries out the process of the overall timing adjustment of control unit 200 and of operation mode setting. CPU 204 temporarily stores the read out image data into image memory 225 and code memory 226 by controlling memory unit 30. The stored image data is read out, and provided to print processing unit 40 of printer unit PR in the copy mode. In the facsimile mode, the image data is provided to facsimile conversion unit 90 of facsimile transmit and receipt unit FAX, and then provided to the telephone line (PSTN) via G3 unit 100 during facsimile transmission. During the facsimile reception in the facsimile mode, the image data from the telephone line (PSTN) is received by G3 unit 100, and temporarily stored in image memory 225 and code memory 226 via facsimile conversion unit 90. The stored image data is read out and then provided to the print processing unit 40 of printer unit PR.

In the facsimile mode, data conversion such as the pixel density conversion process between memory unit 30 and G3 unit 100 is carried out by CPU 204 by controlling facsimile conversion unit 90.

Description of each unit having close relation to each CPU will be given below.

Image data processing unit 20 is first described. Image data processing unit 20 includes an A/D converter, a shading correction unit, a magnification processing unit, an image quality correction unit, and the like. Image data processing unit 20 processes an image signal provided from line sensor 17 of scan optical system 10, and provides image data to memory unit 30. The image signal provided from line sensor 17 is A/D converted and quantizied into image data of 8 bits for each pixel, and then subjected to various processes such as shading correction, variable scale magnification, and picture quality correction and eventually output as image data.

Next memory unit 30 is described. Memory unit 30 includes a binarization processing unit for generating binary data according to parameter settings provided from a switching unit and CPU 204, a multiport image memory 225 having a capacity of 2 pages in A4 size at 400 dpi, a code processing unit having a compressor and expander that can operate independently, a code memory 226 having a multiport, a multi-value processing unit for generating multi-value data according to parameter settings from a rotary processing unit and CPU 204, and the like. CPU 204 provides overall control of these units.

Facsimile conversion unit 90 is described. Facsimile conversion unit 90 is located between memory unit 30 and G3 unit 100, and carries out format conversion of image information in transmission and reception. Format conversion of image information includes following conversions (a)–(d).

(a) Conversion of pixel density of image data
(b) Magnification and reduction in size of image data
(c) Conversion of bit width of code data
(d) Conversion of coding method of code data These processes are controlled by CPU 204.

(3) Operation Sequence of the Copying Machine as a Whole in Each Operation Mode

An operation sequence of the copying machine as a whole in each operation mode is to be described. Description of the command such as the request and answer transmitted and received between CPUs 201–204, or the flow of data is given below, and the description of the command such as the request and answer of lesser importance will be omitted.

(3-1) Operation sequence in copy mode

In the copy operation, image data read by image reader IR is temporarily written into image memory 225, and provided to print processing unit 40 to be printed.

Figure 4:
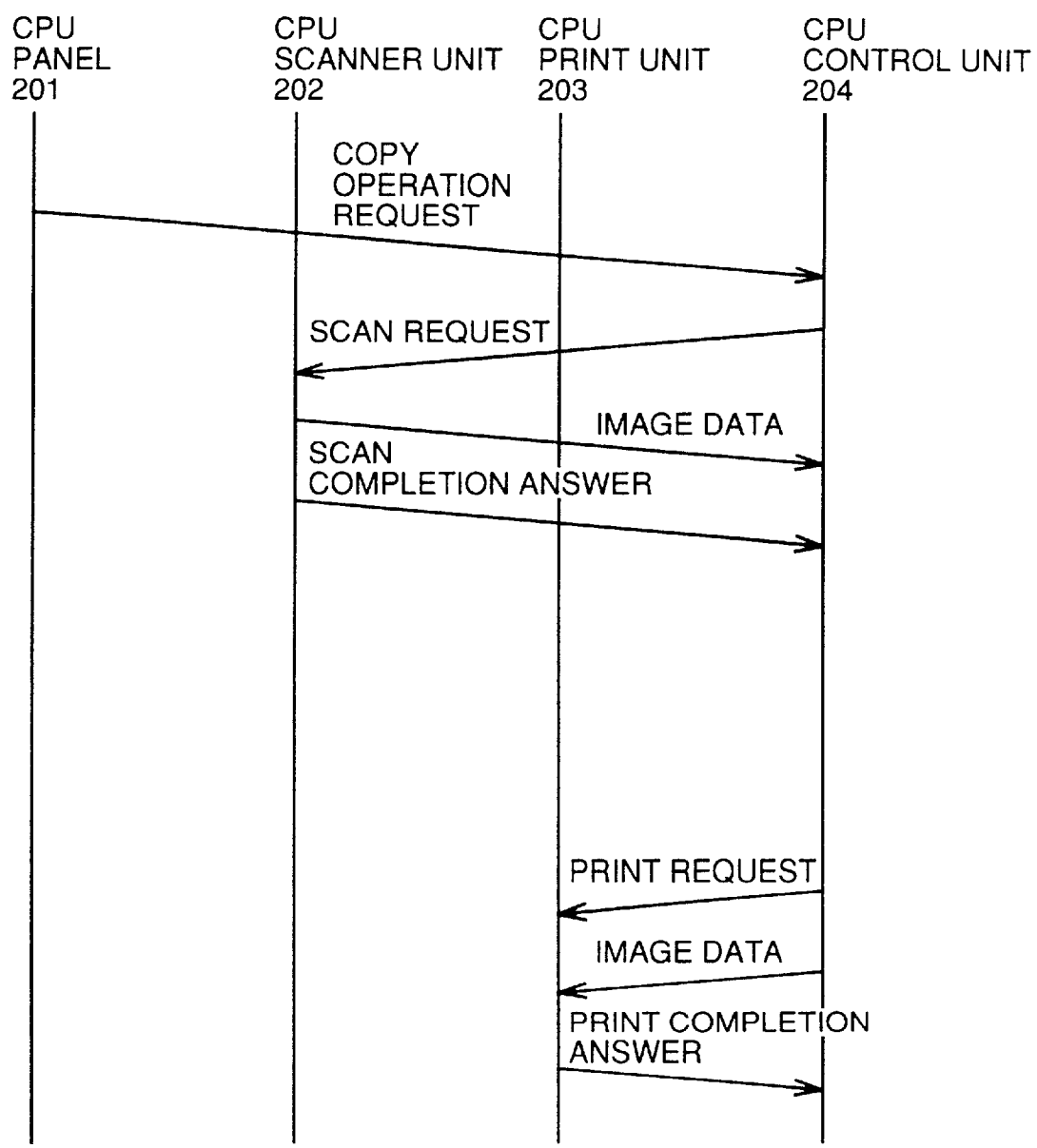
FIG. 4 shows how the command and image data are transmitted and received between respective CPUs in copy operation.

FIG. 4 shows an operation sequence in the copy mode. Details will be given with reference to FIG. 4. In the copy mode, a copy operation request is provided from CPU 201 to CPU 204 by pressing a start key 116. CPU 204, responsive to this, outputs a scan request to CPU 202. CPU 202 starts scanning, and carries out image processing according to the set image processing mode when the scanning reaches an image area of an original. The processed image data is provided to memory unit 30, and stored in image memory 225.

After reading of the original image by the scanning is completed, a scan completion answer is provided from CPU 202 to CPU 204, and a print request is provided from CPU 204 to CPU 203. CPU 204 then reads out the image data to be copied from image memory 225, and outputs the image data to print processing unit 40. Print processing unit 40 starts printing of the output image data. When the printing is completed, a print completion answer is provided from CPU 203 to CPU 204, and CPU 204 completes the operation by clearing image memory 225.

(3-2) Operation sequence in facsimile transmission mode

In the facsimile transmission operation, the image data read by image reader IR is temporarily written into image memory 225, subjected to compression processing and stored in code memory 226, and then subjected to data conversion by facsimile conversion unit 90 and transmitted as image data.

Figure 5:
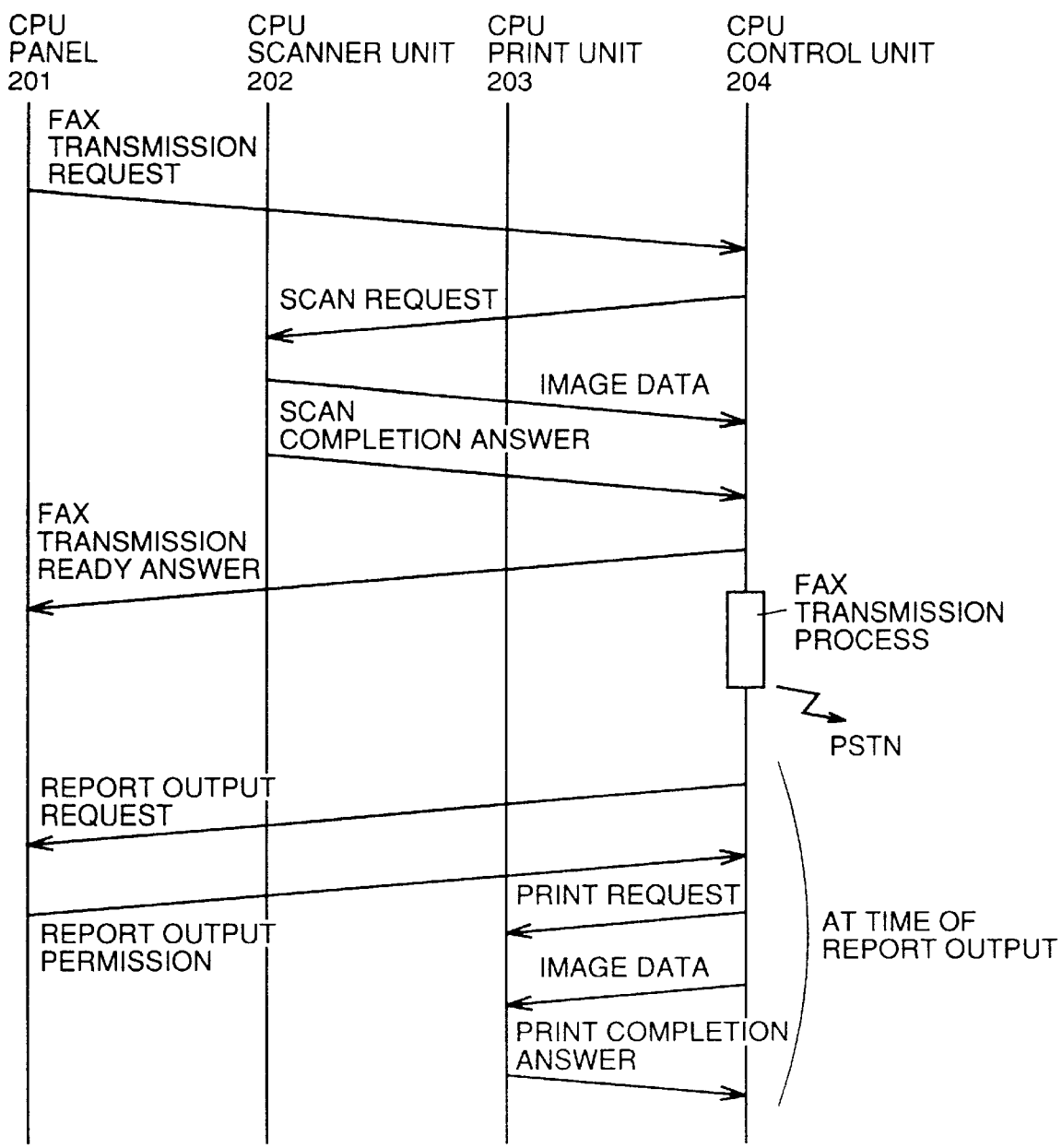
FIG. 5 shows how the command and image data are transmitted and received between respective CPUs in facsimile transmission operation.

FIG. 5 shows an operation sequence in the facsimile transmission mode. With reference to FIG. 5, in the facsimile transmission mode, a facsimile transmission request is provided from CPU 201 to CPU 204 by the pressing of start key 116. From CPU 204, a scan request is output to CPU 202. CPU 202 then starts scanning, and performs image processing according to the set image processing mode when the scanning reaches an image area of an original, and the processed image data is provided to memory unit 30. The output image data is stored in image memory 225. CPU 204 thereafter carries out compression processing of the image data in image memory 225, and stores code data in code memory 226.

After reading of the original image by the scanning is completed, a scan completion answer is provided from CPU 202 to CPU 204, and a facsimile transmission ready answer is output from CPU 204 to CPU 201. When all of the image (code) data to be transmitted to code memory 226 are stored, CPU 204 instructs line connection by controlling G3 unit 100, calls receiver side, carries out line connection, and receives a line connection response.

CPU 204 thereafter reads out the code data and outputs it to facsimile conversion unit 90. Facsimile conversion unit 90 carries out image data conversion, modulates the code data by a modem of G3 unit 100, and transmits it to the called receiver party through a telephone line (PSTN). After the transmission of the image data is completed, CPU 204 disconnects the line by sending out a line disconnection request to the called receiver side, and clears the memory to complete the operation.

When a communication management report is automatically output after the facsimile transmission is completed, or an error report showing the content of an error occurred during transmission is output, a report output request is provided from CPU 204 to CPU 201. CPU 201 which controls a scan panel confirms that there is no operation concerning copy or print, and outputs a report output permission to CPU 204. Based on this permission, a print request is provided from CPU 204 to CPU 203. CPU 204 provides image data (data of the report) to print processing unit 40, and print processing unit 40 starts printing. After the printing of the report is completed, a print completion answer is provided from CPU 203 to CPU 204, and CPU 204 clears the memory and completes the operation.

(3-3) Operation sequence in facsimile reception mode

In the facsimile reception operation, the received image data is subjected to data conversion at facsimile conversion unit 90, stored in code memory 226, and subjected to decompression process and written into image memory 225. Output of the image is requested to CPU 201, and if the request is permitted, image data is read by printer PR and printed.

Figure 6:
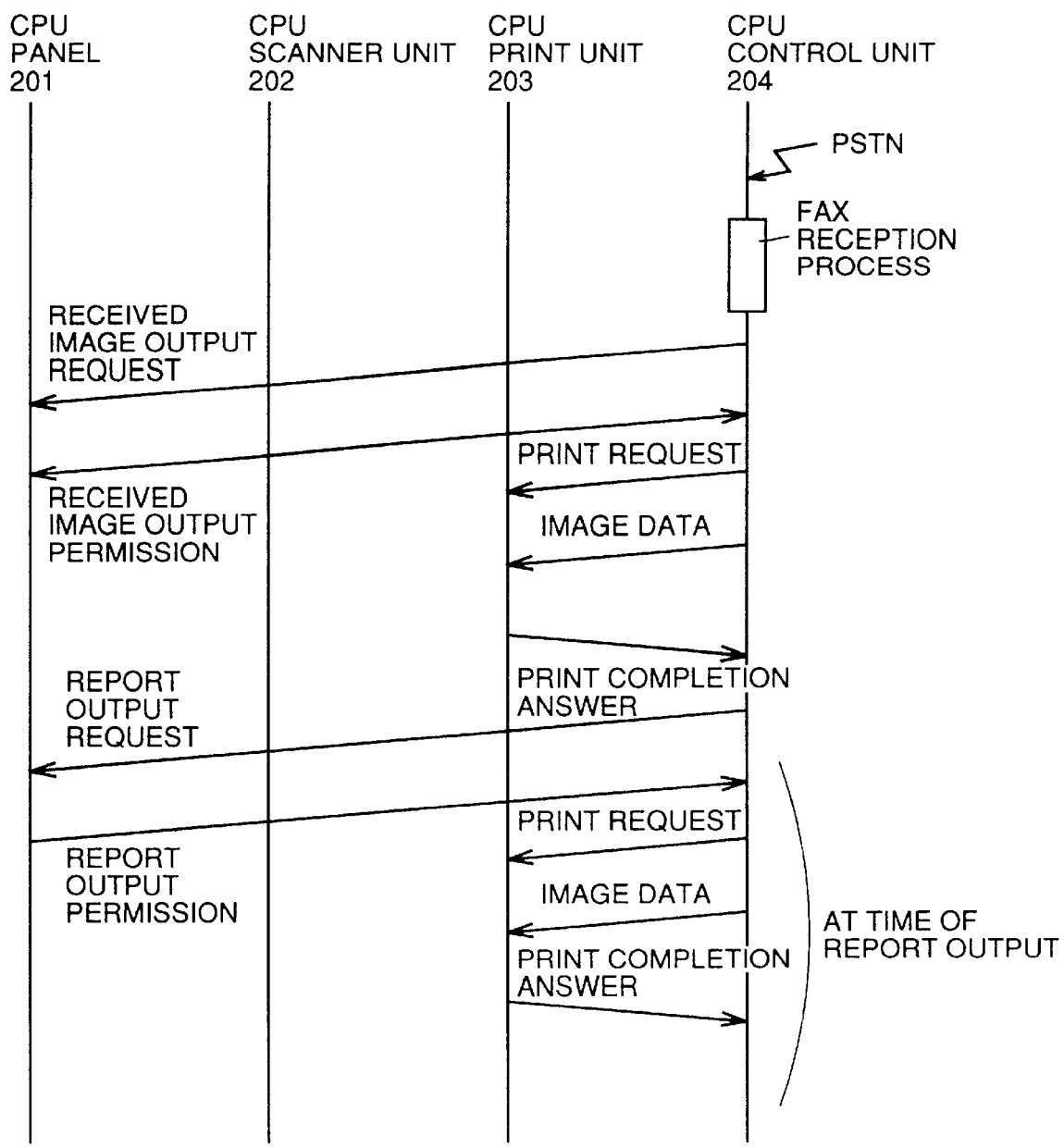
FIG. 6 shows how the command and image data are transmitted and received between respective CPUs in facsimile reception operation.

FIG. 6 shows an operation sequence in the facsimile reception mode. Referring to FIG. 6, a reception request is provided from a transmitter side to CPU 204, CPU 204 carries out line connection. An image reception mode such as encoding method, reception magnification, the number of pixels per line of received image, the number of pixels per line of input image, the maximum number of tolerable line error, and the like are set by CPU 204.

When code memory 226 is prepared for reception, the image data output from the transmitter is demodulated by the modem in G3 unit 100, subjected to data conversion at facsimile conversion unit 90, and stored in code memory 226. After reception of the image data is completed, CPU 204 carries out line disconnection process.

CPU 204 provides an image output request to CPU 201. CPU 201 which controls operation input unit OP acknowledges that there is no operation concerning copy or print, and outputs an image output permission to CPU 204. Based on the permission, CPU 204 provides a print request to CPU 203. When CPU 204 outputs the print request, CPU 204 carries out decompression process of code data. Image data obtained by the decompression process of the code data is written into image memory 225. Image data read from image memory 225 is provided to printer unit PR, and printed. After the printing is completed, CPU 203 provides a print completion answer to CPU 204. CPU 204 accordingly clears the memory, and the operation is completed.

When a communication management report is automatically output after the facsimile transmission, or an error report showing the content of an error during reception is output, a report output request is output from CPU 204 to CPU 202. When the request is permitted by CPU 201, a print request is output from CPU 204 to CPU 203. Image data (data of the report) is provided from CPU 204 to print processing unit 40, and print processing unit 40 starts printing. After the printing of the report is completed, a print completion answer is output from CPU 203 to CPU 204, CPU 204 clears the memory, and the operation is completed.

(4) Outline of the Control Flow of Each CPU

An outline of a control flow conducted by each of CPUs 201–204 is described. These four CPUs operate independently except the process concerning transmission and reception of a command.

(4-1) Control flow of CPU 201

Figure 7:
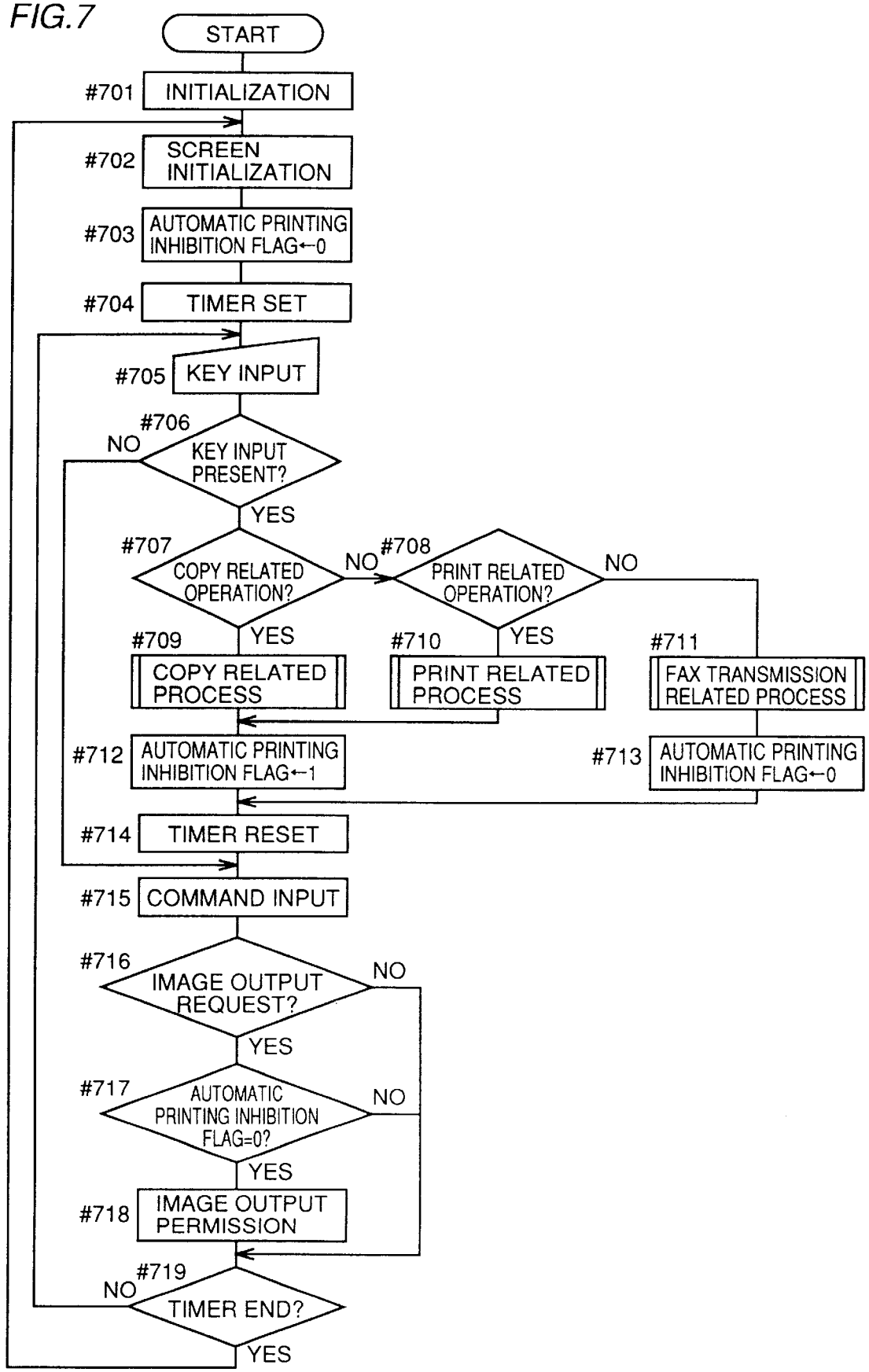
FIGS. 7–10 are flow charts of a main routine showing the procedure of the control executed respectively by CPUs 201–204.

FIG. 7 is a flow chart showing a flow of the control carried out by CPU 201 for operation input unit OP. At operation input unit OP, when the power of the copying machine is turned on, a panel display program stored in ROM 211 and an initial display mode stored in NVRAM 227 are read in an initial setting routine (step #701, "step" is hereinafter omitted), and an initial screen is displayed on operation input unit OP (#702). CPU 201 sets an automatic printing inhibition flag to 0 (#703), and a timer is set for an automatic clearing function which inhibits automatic printing (#704).

If there is a key input (#706) as a result of a key input process (#705), whether the key input is for an operation related to copy (#707) or an operation related to print (#708) is determined. The printing in this case refers to, for example, to output by manual operation a communication management report created independently in the copying machine. When the key input is determined to be either of the operations (YES respectively in #707, #708), a process related to the display unit of operation unit OP, a process related to a request to CPU 204 or the like is carried out (#709, #710), and the automatic print inhibition flag is set to 1 (#712). In the process operation related to copy, print density, magnification, recording sheet size, and the like are set. When the key input relates neither to copying nor printing operation, i.e. when it relates to facsimile transmission (NO in both #707, #708), a process related to the display unit, a process related to a request to CPU 204 or the like (#711) is carried out, and thereafter the automatic print flag is set to 0 (#713). In the operation related to facsimile transmission, for example, a receiver is set. After the automatic print flag is set to 1 or 0, the timer is reset (#714).

When there is no key input, the operation jumps to next command input (#715). A request from CPU 204 is taken by CPU 201 by command input (#715). An image output request is received (YES in #716), and an image output permission is provided to CPU 204 (#718) if the automatic print inhibition flag is 0 (YES in #717). When there is no image output request (NO in #716), or the automatic print inhibition flag is not 0 (NO in #717), process of image output permission (#718) is skipped. It is determined whether timer count is completed or not (#719). If completed (YES in #719) the operation is returned to screen initialization routine (#702) and if not completed (NO in #719) returned to key input process (#705).

Owing to the process carried out by CPU 201, automatic printing is not unnecessarily inhibited and an operator can comfortably proceed the operation.

(4-2) Control flow of CPU 202

Figure 8:
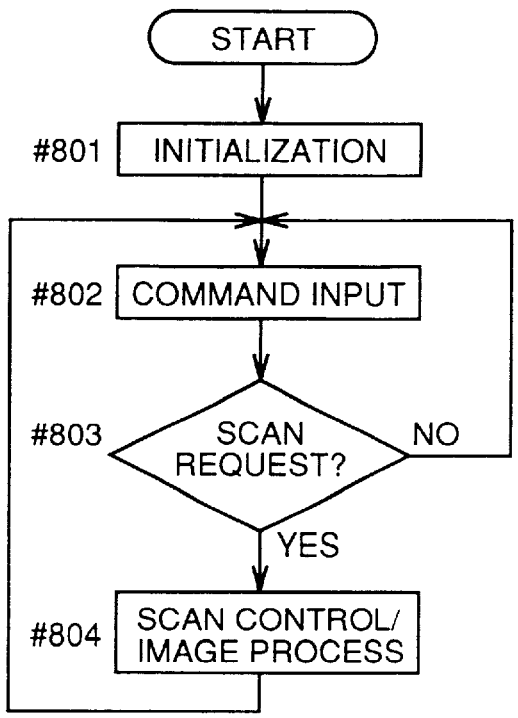

FIG. 8 is a flow chart showing a flow of a control by CPU 202 for a scanner unit (image processing unit 20 and scan optical system 10). In the scanner unit, when power is turned on, initialization is carried out according to a program registered in ROM 212 (#801). Control waits for a command from CPU 202 (#802, #803). A command from CPU 204 is input (#802), and if a scan request is detected (YES in #803) in a scan request branch (#803), a scan control/image processing routine (#804) is started. If there is no scan request (NO in #804), the command waiting state continues (#802). In scan control/image processing routine (#804), scanning and image processing are carried out in an image reading mode with resolution, tone and the like provided together with the scan request from CPU 204. After image data is provided to CPU 204, a scan completion answer is sent to CPU 204. After these processes, the command waiting state again starts (#802).

(4-3) Control flow of CPU 203

Figure 9:
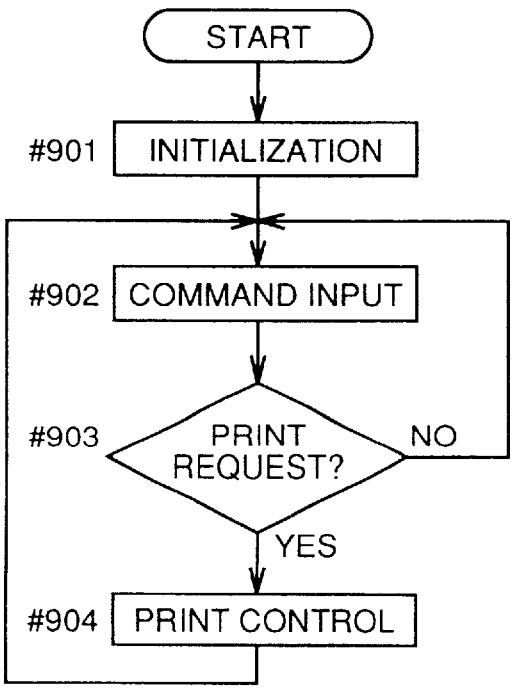

FIG. 9 is a flow chart showing a flow of control by CPU 203 for a print unit (print processing unit 40, optical system 60, and image forming system 70). In the printing unit, when power is turned on, initialization is carried out according to a program registered in ROM 213 (#901). A command from CPU 204 is waited (#902, #903). A command is provided from CPU 204 (#902), and a print control routine (#904) is started if a print request is detected (YES in #903) in print request branch (#903). If there is no print request (NO in #903), the command waiting state continues (#902). In a print control routine (#904), print process is carried out in a print mode with resolution and tone provided together with the print request from CPU 204. The image data provided from CPU 204 is sent to printer unit PR and printed, and a print completion answer is provided to CPU 204. After these processes, the command waiting state again starts (#902).

(4-4) Control flow of CPU 204

Figure 10:
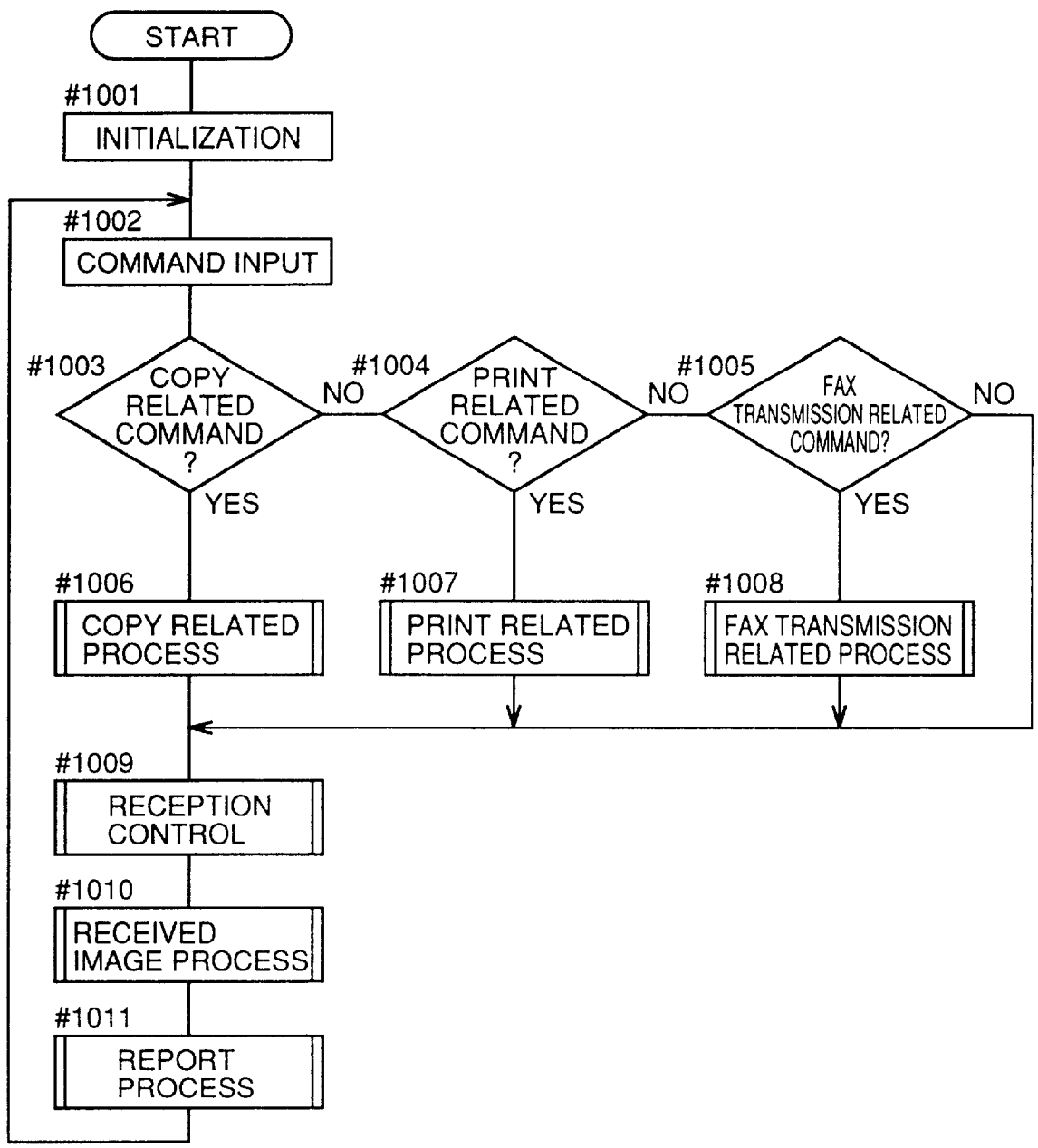

FIG. 10 is a flow chart showing a flow of a control by CPU 204 in control unit 200. In control unit 200, when power is turned on, initialization is carried out according to a program registered in ROM 214 (#1001). When a command is provided from CPU 201 which controls operation input unit OP (#1002), determination is made whether the command is related to copy (#1003), print (#1004), or facsimile transmission (#1005). According to the determination, the process related to copy (#1006), the process related to print (#1007), other process related to facsimile transmission or the like (#1008) are respectively carried out. In these processes, CPU 204 provides and receives the scan request, the print request, and the image data to and from CPUs 201–203 which control respective processes or the like. CPU 204 also receives the scan completion answer, the print completion answer and the like from these CPUs.

After this operation, if there is a facsimile reception by G3 unit 100 from a telephone line (PSTN), a process is carried out in a reception control routine in which image data is received (#1009). After this process, received image is output in a received image processing routine (#1010). If there is a need for output of an error occurrence report or a facsimile communication management report, a process is carried out in a report processing routine (#1011). After these processes, the command waiting state again starts (#1002).

Figure 11:
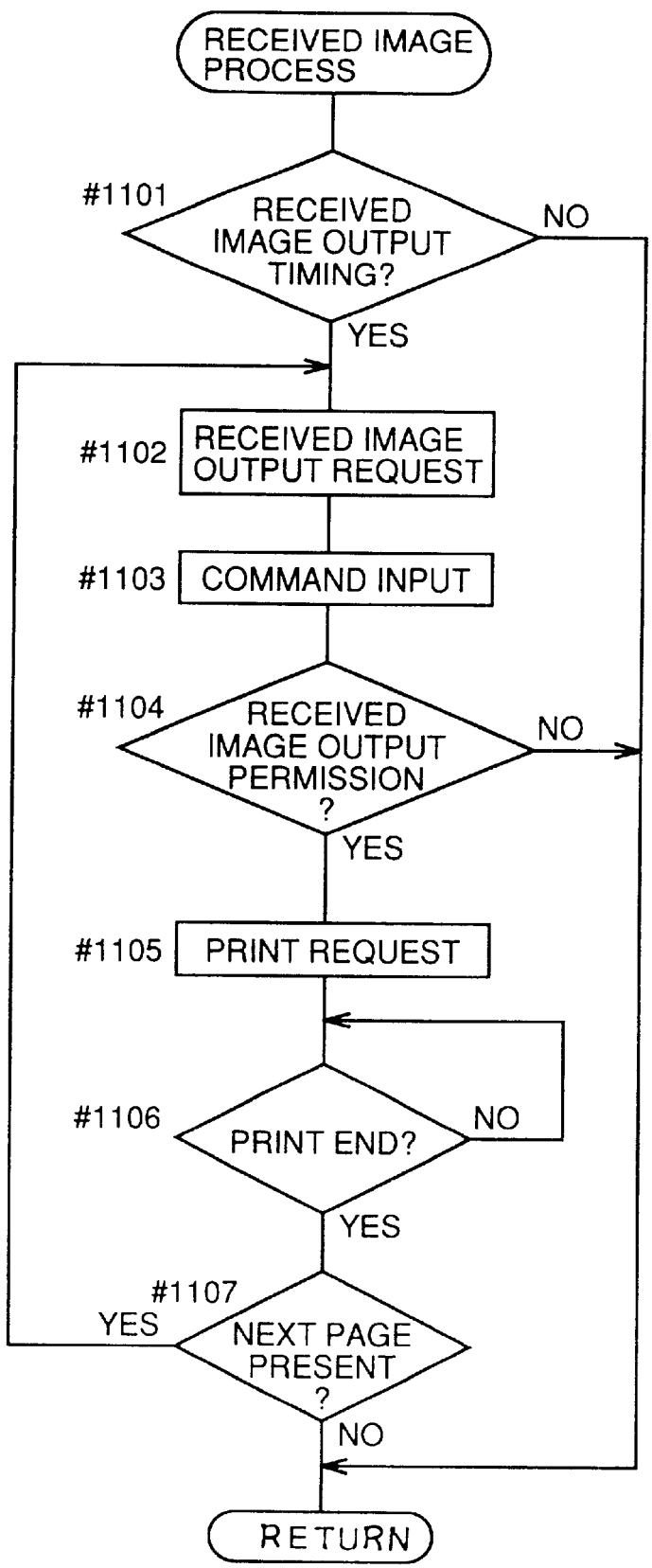
FIG. 11 is a flow chart showing the procedure of the sub-routine of the received image processing in #1010 of FIG. 10.

Referring to FIG. 11, a process flow in the received image processing routine (#1010) in FIG. 10 is described. Whether it is a reception image output timing or not is determined (#1101). If it is determined that it is not a reception image output timing (NO in #1101), CPU 204 completes this routine. If it is determined to be reception image output timing (YES in #1101), a received image output request is provided to CPU 201 (#1102). When a received image output permission is input to CPU 204 (YES in #1104) by command input (#1103), a print request is provided to CPU 203 (#1105). If the received image output permission is not provided (NO in #1104), CPU 204 completes this routine.

When printing is completed after print request (#1106), determination is made whether there is a next page (#1107). If there is a next page (YES in #1107), a process from received image output request (#1102) is repeated. If there is not a next page (NO in #1107), CPU 204 completes this routine.

Figure 12:
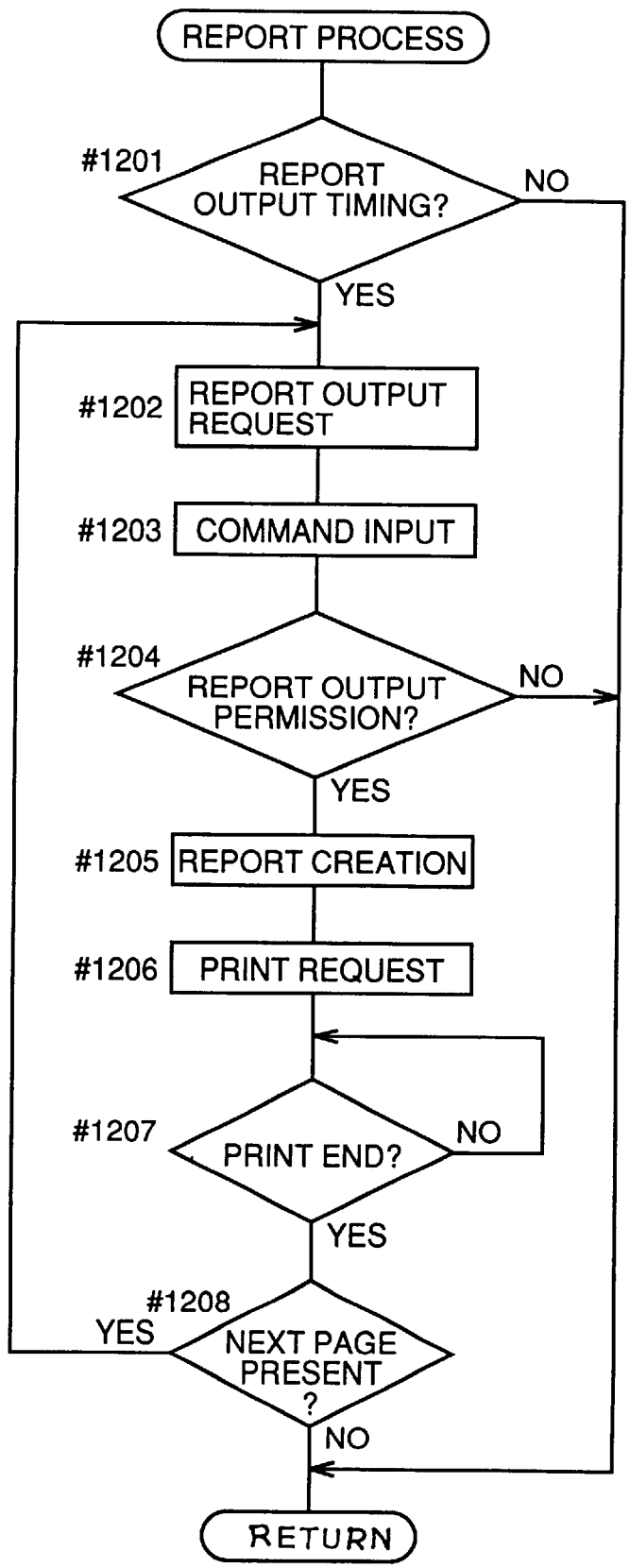
FIG. 12 is a flow chart showing the procedure of the sub-routine of the report processing in #1011 of FIG. 10.

Referring to FIG. 12, a process flow in the report processing routine (#1011) in FIG. 10 is described. (The flow of the process is similar to the flow of the received image processing routine except for a report generating process (#1205).) It is determined whether it is a report output timing or not (#1201). If it is determined that it is not a report output timing (NO in #1202), CPU 204 completes this routine. If it is determined to be a report output timing (YES in #1201), report output request is provided to CPU 201 (#1202). When report output permission is provided to CPU 204 (YES in #1204) by command input (#1203), a report is created (#1205), and a print request is provided to CPU 203 (#1206). If report permission is not provided (NO in #1204), CPU 204 completes this routine.

When printing is completed after the print request (#1207), determination is made whether there is a next page or not (#1208). If there is a next page (YES in #1208), a process from report output request (#1202) is repeated. If there is not a next page (NO in #1208), CPU 204 completes this routine.

In the embodiment described above, description is made as to the case in which automatic printing is started when facsimile reception data is stored, and a case in which a facsimile transmission management report showing a result of facsimile transmission and reception is automatically printed. However, the present invention can be applied to a case in which automatic printing of other reports such as an error report showing content of an error is initiated.

Although a condition for releasing the automatic print inhibition is that a prescribed time is passed from the last input by the key in the embodiment described above, this condition may be others such as pressing of the start key.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   first setting means for setting a printing operation;
   printing means for performing printing based on image data;
   transmission means for transmitting image data to an external apparatus in a facsimile operation;
   automatic printing means for controlling said printing means to perform an automatic printing operation, other than the printing operation set by said first setting means, without interfering with a transmitting operation of the facsimile operation; and
   automatic printing control means for inhibiting the automatic printing operation when the printing operation is set by the first setting means, wherein
   a start of the automatic printing operation is accepted during the transmitting operation of the facsimile.

2. The image processing apparatus according to claim 1, wherein the facsimile operation setting comprises setting of a transmission destination.

3. The image processing apparatus according to claim 1, wherein the printing operation setting comprises setting of printing density.

4. The image processing apparatus according to claim 1, wherein the printing operation setting comprises setting of magnification.

5. The image processing apparatus according to claim 1, wherein the printing operation setting comprises setting of recording sheet size.

6. The image processing apparatus according to claim 1, wherein said automatic printing means controls said printing means to print out a communication management report.

7. The image processing apparatus according to claim 1, wherein said automatic printing means controls said printing means to print out an error message when an error occurs.

8. An image processing apparatus, comprising:
   input means for setting one of a plurality of operations of the image processing apparatus, said plurality of operations including a printing operation and a facsimile operation;
   transmission means for transmitting image data to an external apparatus;
   printing means for performing printing based on image data;
   automatic printing means for controlling said printing means to perform an automatic printing operation other than the printing operation set by said input means, without interfering with a transmitting operation of the facsimile operation; and
   automatic printing control means for inhibiting the automatic printing operation when the print operation is set by the input means, wherein
      a start of the automatic printing operation is accepted during the transmitting operation of the facsimile.

9. The image processing apparatus according to claim 8, wherein the facsimile operation setting comprises setting of a transmission destination.

10. The image processing apparatus according to claim 8, wherein the printing operation setting comprises setting of printing density.

11. The image processing apparatus according to claim 8, wherein the printing operation setting comprises setting of magnification.

12. The image processing apparatus according to claim 8, wherein the printing operation setting comprises setting of recording sheet size.

13. The image processing apparatus according to claim 8, wherein said automatic printing means controls said printing means to print out a communication management report.

14. The image processing apparatus according to claim 8, wherein said automatic printing means controls said printing means to print out an error message when an error occurs.

15. A method for processing an image, comprising the steps of:
   setting one of a plurality of operations of an image processing apparatus,
   said plurality of operations including a first printing operation and a facsimile operation;
   performing an automatic printing operation other than the first printing operation, without interfering with a transmitting operation of the facsimile operation; and
   inhibiting the automatic printing operation when the first printing operation is set, wherein
      a start of the automatic printing operation is accepted during the transmitting operation of the facsimile.

16. The image processing apparatus of claim 1, wherein the automatic printing operation comprises a received facsimile image stored in a memory.

17. The image processing apparatus according to claim 1, wherein the first and second setting means are each operation keys of said image processing apparatus.

18. An image processing apparatus, comprising:
   printing means for performing printing based on image data;
   transmission means for transmitting image data to an external apparatus;
   first setting means for setting a printing operation;
   second setting means for setting a transmitting operation;
   automatic printing means for controlling said printing means to perform an automatic printing operation other than the printing operation set by said first setting means, without interfering with the transmitting operation; and
   automatic printing control means for inhibiting the automatic printing operation when the printing operation is set by the first setting means, wherein
      a start of the automatic printing operation is accepted during the transmitting operation.

19. An image processing apparatus, comprising:
   transmission means for transmitting image data to an external apparatus;
   printing means for performing printing based on image data;
   input means for setting one of a plurality of operations of the image processing apparatus, said plurality of operations including a printing operation and a transmitting operation;
   automatic printing means for controlling said printing means to perform an automatic printing operation other than the printing operation set by said input means, without interfering with the transmitting operation; and
   automatic printing control means for inhibiting the automatic printing operation when the printing operation is set by the input means, wherein
      a start of the automatic printing operation is accepted during the transmitting operation.

20. A method of processing an image, comprising the steps of:
   setting one of a plurality of operations of an image processing apparatus, said plurality of operations including a first printing operation and a transmitting operation;
   performing an automatic printing operation other than the first printing operation, without interfering with the transmitting operation; and
   inhibiting the automatic printing operation when the first printing operation is set, wherein
      a start of the automatic printing operation is accepted during the transmitting operation.

21. An image processing apparatus having a function related to facsimile transmission/reception and a function related to printing operation, comprising:
   first setting means for setting the function related to facsimile transmission by key input done by the operator;
   second setting means for setting the function related to the printing operation by key input done by the operator;
   printing means for performing the printing operation based on image data;
   automatic printing control means for allowing said printing means to perform an automatic printing operation irrespective of the setting by said first and second setting means; and determining means for determining, when key input is done, whether the key input is done for the facsimile transmission or for the printing operation, wherein if the key input is done for the printing operation, the automatic printing operation by said automatic printing control means is inhibited and, if the key input is done for the facsimile transmission, the automatic printing operation is permitted.

22. The image processing apparatus according to claim 21, wherein said automatic printing operation is performed in parallel with said facsimile transmission.

23. The image processing apparatus according to claim 21, wherein the inhibition of said automatic printing is cancelled when a predetermined time has lapsed from the time at which setting is made by said first setting means or said second setting means.

* * * * *

UNITED STATES PATENT AND TRADEMARK OFFICE
CERTIFICATE OF CORRECTION

PATENT NO.    : 6,646,755 B1
DATED         : November 11, 2003
INVENTOR(S)   : Toshimichi Iwai et al.

It is certified that error appears in the above-identified patent and that said Letters Patent is hereby corrected as shown below:

<u>Title page,</u>
Item [56], References Cited, U.S. PATENT DOCUMENTS, add:
-- 6,108,103   8/2000    Kurozasa............. 358/405
   5,644,405   7/1997    Sato.................. 358/404
   5,506,657   4/1996    Ito et al.............. 355/202
   5,818,606  10/1998    Muramatsu et al..... 358/405

FOREIGN PATENT DOCUMENTS

JP    6-319032    11/1994
JP    6-350772    12/1994
JP    7-58886     02/1995 --

Signed and Sealed this

Ninth Day of March, 2004

JON W. DUDAS
*Acting Director of the United States Patent and Trademark Office*